Dec. 24, 1968  S. KOKES  3,417,710
CONVEYOR APPARATUS
Filed Jan. 13, 1967  3 Sheets-Sheet 3

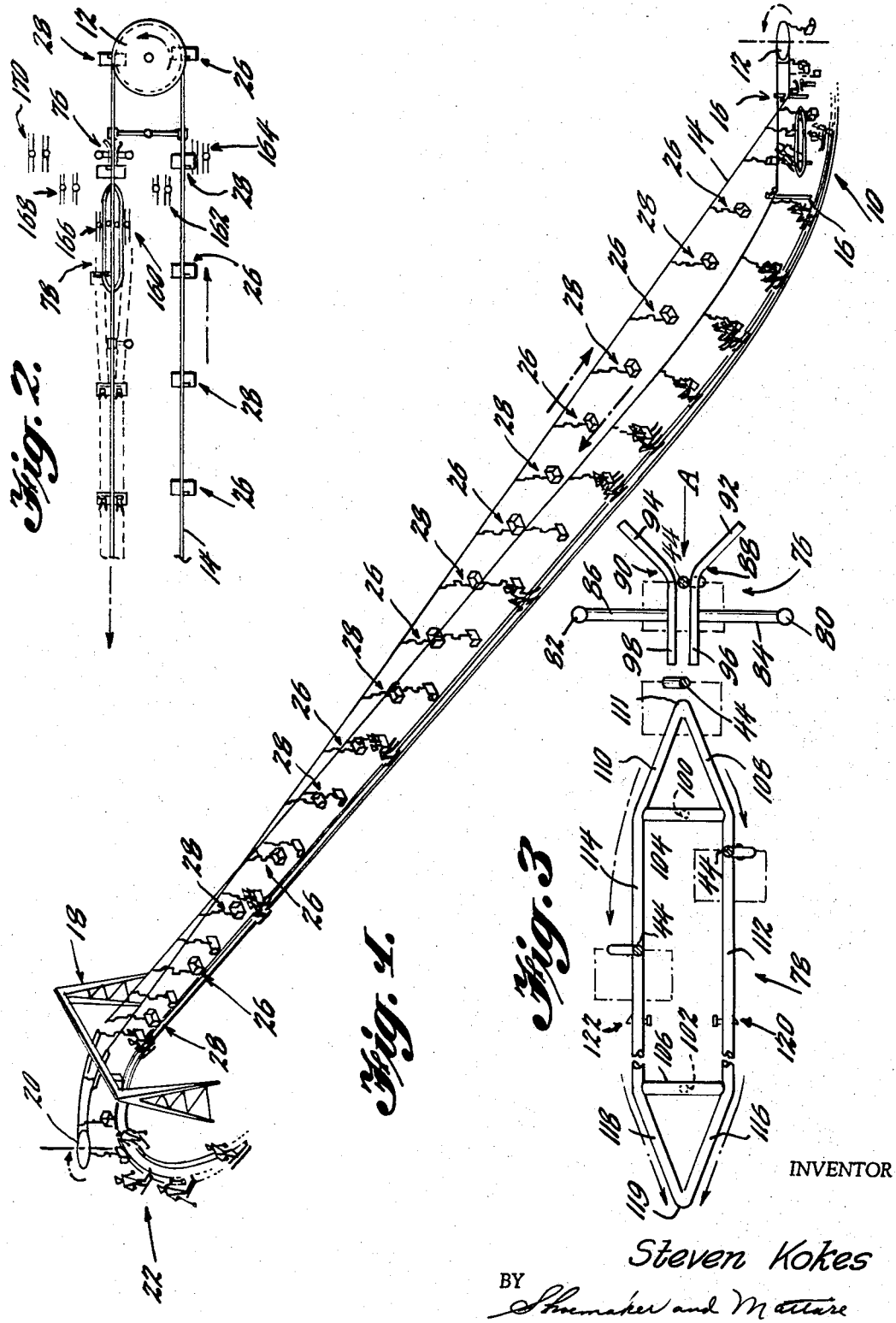

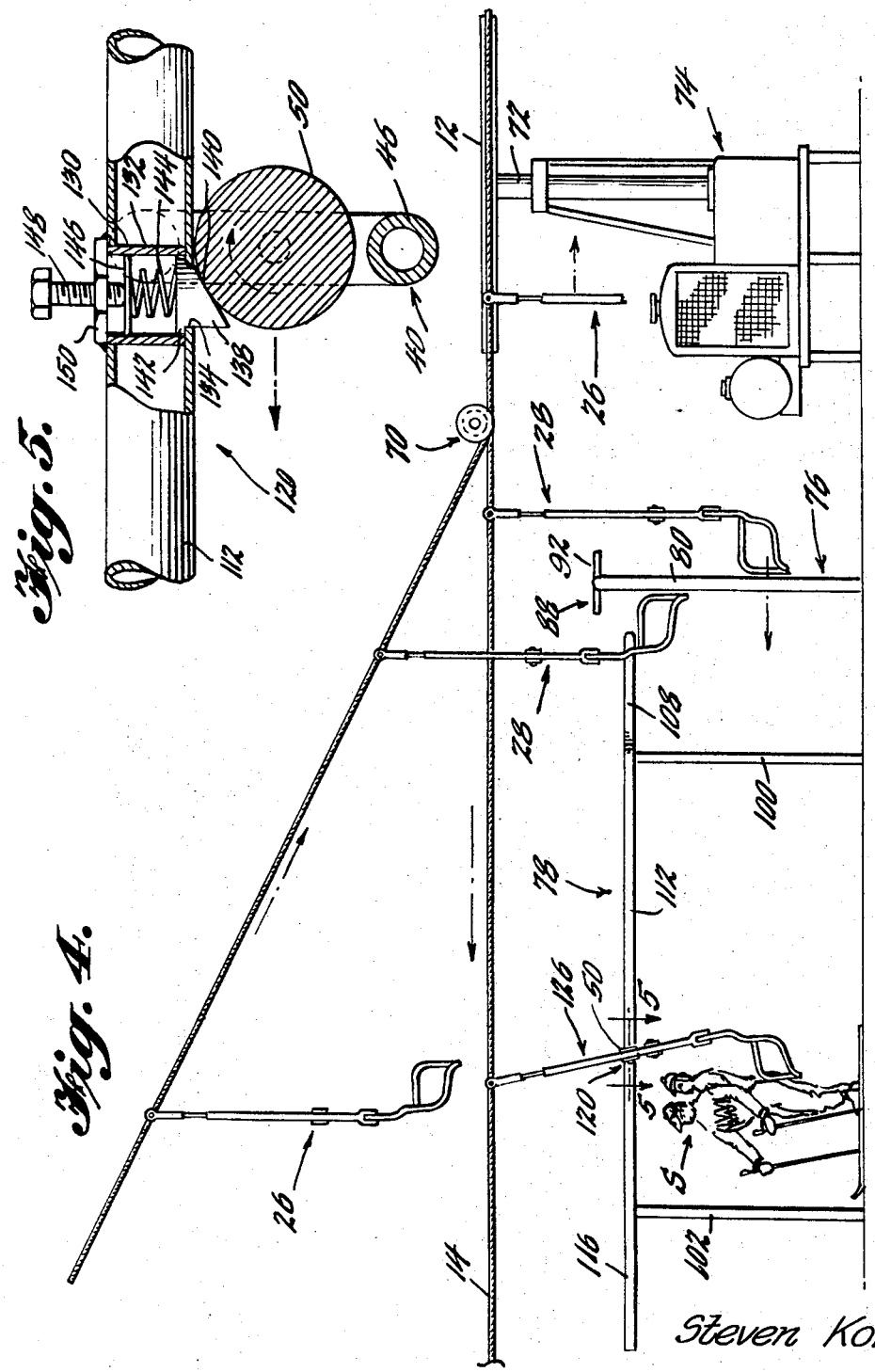

INVENTOR
Steven Kokes
BY Shoemaker and Mattare
ATTORNEYS 3,417,710
CONVEYOR APPARATUS
Steven Kokes, 4212 Great Oak Road,
Rockville, Md. 20853
Filed Jan. 13, 1967, Ser. No. 609,148
9 Claims. (Cl. 104—173)

ABSTRACT OF THE DISCLOSURE

A plurality of spaced conveyor means are provided along a supporting means which moves the conveyor means in a particular path of movement past a loading station. A fixed diverting means is disposed at the loading station and is engageable with anti-friction means on the conveyor means. The anti-friction means of successive conveyor means are offset on opposite sides laterally of the path of movement of the conveyor means so that successive ones of the conveyor means are diverted to opposite sides of the diverting means whereby the conveyor means may be loaded at opposite sides of the diverter means.

Background of the invention

The present invention relates to conveyor apparatus in general and more particularly to a ski-lift.

Apparatus according to the present invention is adapted to be employed in any application wherein a suitable conveyor means is to be loaded at a particular station. The invention is directed to the concept of increasing the capacity of the conveyor means while at the same time allowing sufficient time for loading of the conveyor means. This problem is especially encountered in present-day ski lifts wherein the present facilities are greatly overcrowded at certain periods of operation resulting in excessive delay in loading skiers onto the ski lift such that it is common for a skier to stand in line for periods up to and exceeding a half an hour while waiting to be loaded onto the ski lift.

It is of course always possible to duplicate the presently existing installations, but this suggestion does not offer a practical solution to the problem since in most cases it would not be economically feasible to expend the amount of money required to build a second installation.

It is accordingly a principal purpose of the present invention to substantially increase the capacity of a ski lift up to twice its present-day capacity at a minimum expense.

It has been suggested in the prior art that the number of conveyor means on the ski lift be doubled by inserting an additional conveyor means between each pair of existing conveyor means and then manually switching successive conveyor means to opposite sides of the path of movement of the conveyor means so that passengers may be loaded onto the conveyor means at two loading stations disposed substantially opposite one another on either side of the path of movement of the ski tow cable. Such an arrangement is disclosed in U.S. Patent 3,112,710 wherein it is pointed out that by so switching successive ones of the conveyor means to opposite sides of the path of movement, the same time interval is provided at each loading station between conveyor means arriving at a particular loading station so that the passengers can still be safely and efficiently loaded onto the ski lift while the over-all capacity thereof is substantially doubled.

It is of course apparent that the capacity of the ski lift need not necessarily be doubled, but it can be increased in any increments desired depending upon the ability of the support structure and the driving mechanism to support such additional load.

The manual switching of conveyor means as suggested in the prior art must be carried out by an attendant constantly on duty. This type of operation has been suggested to be practical with a T-bar ski lift, a J-bar ski lift, a Poma-type ski lift and others which provide support to the passengers in the vicinity of their center of gravity and wherein the conveyor means is mounted on the cable in a manner permitting the operator to hand it to skiers at either loading station.

This type of manual shifting prior art arrangement presents a number of problems. Firstly, the switching is obviously not automatic and must be continuously carried out by hand. Such a method of operation is not considered to be practical with conventional chair lifts due to the much greater size and bulk thereof as compared to the aforementioned type of ski lifts. Such a manual shifting arrangement of a conventional chair lift would further not be practicable since conventional chair lifts afford no means for permitting sufficient lateral deflection of the chairs to enable successful operation in this manner.

When manually switching the conveyor means, much depends on the skill of the attendant in properly positioning the conveyor means so as to be in the right position for the skiers to be supported thereby and further to attempt to retard movement of the conveyor means as the conveyor means comes into contact with the skiers to minimize the force of contact with the skiers.

Additionally, the conveyor means occasionally has considerable swinging movement from side to side as it enters the loading area thereby making it difficult for an attendant to grasp the conveyor means. Furthermore, if a conventional chair lift arrangement were attempted to be operated manually as for example suggested in the aforementioned U.S. patent, the chair would not remain in a vertical position when loading the skiers thereby presenting a very awkward orientation of the chair with respect to the ground while attempting to load skiers thereinto. If the attendant should fail to manually divert the chair, the chair would be apt to hit one or more of the waiting skiers with the danger of possible resulting injuries.

Summary of the invention

The conveyor apparatus of the present invention incorporates an arrangement wherein the conveyor means are automatically diverted alternately to opposite sides of the patth of movement of the conveyor means thereby eliminating the necessity of manually manipulating the conveyor means. This arrangement further enables chair lifts to be effectively operated in the intended manner, the conveyor means of the present invention being firstly provided with a support which permits it to swing in two directions with respect to the overhead cable, and further being provided with a hinge permitting limited pivotal movement of the chair in a direction laterally of the path of movement thereof so that the chair will remain in proper position for loading when passengers sit down in the chair. In this way, the chair is enabled to be readily deflected a sufficient distance to either side of the path of movement and to be properly oriented for loading.

Retarding means is provided which is adapted to engage the conveyor means and momentarily retard the movement thereof so that as the skiers sit down in the chair, it is substantially at rest whereby the impact of the conveyor means on the skiers is reduced to a minimum.

Guide means is also provided for engaging portions of the conveyor means so that the conveyor means will be properly guided into engagement with the diverting means even though the conveyor means may have a considerable swinging motion as it enters the loading area.

An object of the present invention is to provide new and novel conveyor apparatus including means for automatically switching the conveyor means of the apparatus to alternate sides of the path of movement of the apparatus and to further maintain the conveyor means in proper orientation for loading while the conveyor means is switched into such lateral position.

Another object of the invention is the provision of conveyor apparatus including means for automatically retarding the movement thereof at a particular position in a loading area, and including means for properly guiding the conveyor means into the loading area.

*Brief description of the drawing*

FIG. 1 is a somewhat schematic top perspective view of an over-all ski-lift arrangement illustrating the present invention;

FIG. 2 is a somewhat schematic top view of the lower portion of the ski-lift shown in FIG. 1.

FIG. 3 is a top view illustrating the guide means and diverting means of the present invention;

FIG. 4 is a side view illustrating the loading area of a ski-lift according to the present invention;

FIG. 5 is an enlarged sectional view taken substantially along line 5—5 of FIG. 4 looking in the direction of the arrows;

*Description of the preferred embodiment*

Figures 6, 7:
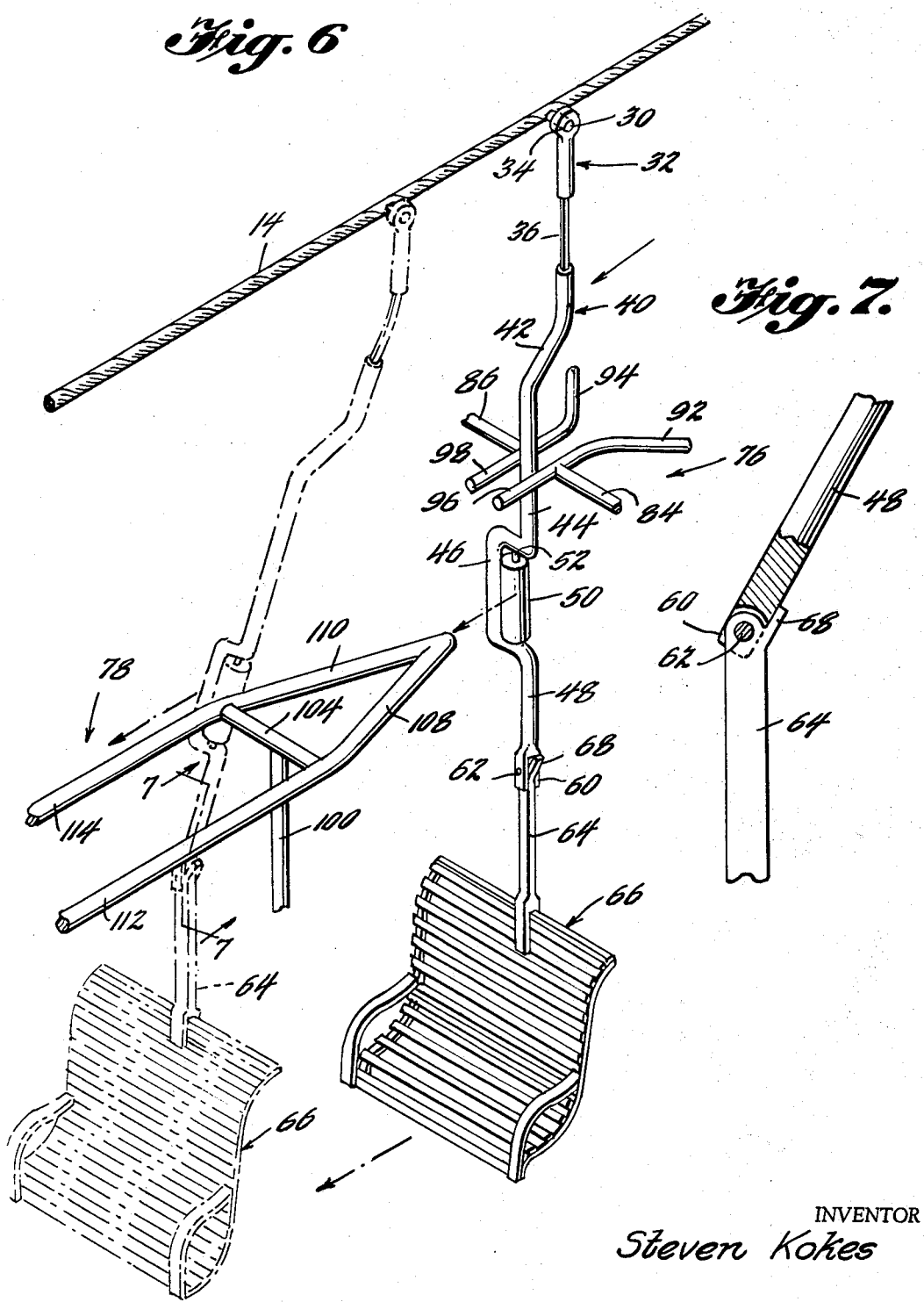
FIG. 6 is a top perspective view on an enlarged scale illustrating the manner in which the conveyor means are automatically switched to one side of the path of movement thereof.
FIG. 7 is an enlarged view partly broken away of the hinge means incorporated in each of the conveyor means.

Referring now to the drawings wherein like reference characters designate corresponding parts throughout the several views, FIG. 1 indicates in a somewhat schematic manner the over-all arrangement wherein the conveyor apparatus of the present invention is employed as a ski-lift. A loading area designated generally by reference numeral 10 is provided at the bottom of a slope, and a relatively large horizontally disposed drive pulley 12 has a ski tow cable 14 trained thereover. This cable is supported by suitable towers indicated generally by reference numeral 16 at the bottom of the slope.

The cable is also supported by a tower structure 18 provided at the upper part of the slope, the cable being trained over an idler pulley 20 disposed adjacent an unloading area 22. It will of course be understood that other suitable towers may be provided along the slope as is conventional.

The present invention is illustrated as comprising a chair lift, but it should be understood that the concept of the invention may also be readily incorporated with various other types of ski lifts such as a T-bar lift, a J-bar lift, Poma-lift, Gondola lift, Aerial cabin or tramway, as well as various commercial conveyors other than ski lifts.

While the invention is described as being incorporated primarily in a loading area, it should also be understood that the same principles apply to an unloading area, and that in the case of a ski-lift, the skiers may be unloaded in the same general manner as they are loaded by diverting successive ones of the conveyor means to opposite sides of the path of movement of the apparatus. In other words, the diverting means of the present invention may also be incorporated in the unloading area 22 illustrated in FIG. 1 as well as in the loading area 10 if so desired.

As illustrated, an additional chair has been inserted between each of the original chairs on the lift thereby doubling the capacity. It should be understood that the number of chairs added may be varied in accordance with the load carrying ability of the lift. Each of the original chairs must be modified in accordance with the present invention to incorporate means for engaging a diverting means whereby the chairs can be readily switched to opposite sides of the patch of movement of the apparatus. As illustrated, the chairs 26 are supported at the original positions along the cable, while the chairs 28 have been added to increase the capacity of the lift. Not only is it possible to modify existing lifts according to this invention, but also new installations can benefit from the increased capacity.

Referring now to FIG. 6, the details of construction of one of the conveyor means of the apparatus may be clearly understood. A support member 30 extends laterally from cable 14. This support member may be connected in several different manners to the cable, and in the illustrated embodiment the end of support member 30 is embedded directly within the strands of wire of the cable so as to remain rigidly in the position shown and extending perpendicularly from the side thereof.

The conveyor means includes an uppermost end portion 32 having an enlarged terminal end 34 which receives support member 30, the connection being such that end portion 32 is adapted to pivot about a longitudinal axis extending through support member 30. This allows the conveyor means to hang in a vertical position from the cable regardless of the inclination of the cable with respect to horizontal. This pivotal interconnection between members 30 and 32 may be of any suitable conventional construction.

A strap member 36 has the upper end thereof rigidly secured to the lower end of member 32, and the lower end of strap member 36 is rigidly affixed to a depending member 40. Strap member 36 may be formed of a suitable relatively rigid yet flexible material such as spring steel or the like. The strap 36 is of generally rectangular cross sectional configuration with its long axis extending substantially parallel with the cable 14. With this construction, strap member 36 resists any deflection of member 40 fore and aft of the upper end portion 42, and yet the strap member allows ready swinging movement of member 40 laterally to either side of the path of movement of the conveyor means as indicated by the arrows in FIG. 6. The combination of the pivotal interconnection between members 30 and 32 and the flexible strap member 36 is such that the conveyor means is mounted for swinging movement in two directions with respect to the cable.

Depending member 40 includes a first offset portion 42 which join with a downwardly extending portion 44 which is normally disposed substantially beneath cable 14. Portion 44 in turn joins with an offset portion 46 which in turn joins with a downwardly extending portion 48.

An anti-friction roller 50 is mounted upon a shaft 52 supported between spaced parts of the offset portion 46. This roller 50 as seen in FIG. 6 is offset to the far side of the path of movement which extends substantially along a plane extending through portion 44 of the depending member 40. By being so offset, the position of the roller assures that the conveyor means will be properly deflected to one side of the path of movement of the apparatus when it engages the diverting means hereinafter described.

Portion 48 of depending member 40 terminates in a lower bifurcated end 60 having a pin 62 extending therethrough which serves to pivotally support a member 64 the lower end of which is rigidly affixed to a relatively conventional chair 66 adapted to support a skier or several skiers in side by side relationship to one another.

The upper end of member 64 includes a lug 68 extending obliquely therefrom. As seen in FIG. 6, when the conveyor means is hanging vertically downwardly from cable 14, lug 68 is spaced from portion 48 of member 40. When the conveyor means is deflected to one side by the diverter means hereinafter described, it will move into the phantom line position shown in FIG. 6, and lug 68 will then be brought into engagement with the adjacent portion of member 48 as illustrated in FIG. 7. The structure accordingly affords a hinge connection which permits limited pivotal movement of the chair with respect to the member 40 such that when member 40 is canted into the position shown in phantom line in FIG. 6, the chair will hang downwardly in a true vertical position as determined by the interengagement of lug 68 with portion 48 of member 40. Accordingly, when the chair reaches the position wherein it is adapted to receive the skiers, it is properly positioned so that the seat portion of the chair will be disposed substantially horizontally and is prevented by lug 68 from swinging beyond a vertical position thereby preventing the chairs or the skiers seated thereon or their equipment from striking the upstanding support portions of the diverting means as hereinafter described or striking skiers standing on opposite sides of the loading area.

Referring now to FIG. 4, the loading area is illustrated. The descending portion of cable 14 passes under a suitable guide pulley 70 mounted on one of the towers previously described and thence around the drive pulley 12 which is fixed to the output shaft 72 of a suitable drive mechanism indicated generally by reference numeral 74. The horizontal run of cable 14 then moves to the left as seen in FIG. 4 so that the path of movement of the cable and the apparatus extends toward a guide means indicated generally by reference numeral 76 and a diverting means indicated generally by reference numeral 78.

As seen in FIGS. 3, 4 and 6, the guide means 76 includes a pair of substantially vertical extending upright support portions 80 and 82 having rigidly secured to the upper ends thereof substantially horizontally disposed support members 84 and 86 which extends toward one another and which support at their inner ends the guide members indicated generally by reference numerals 88 and 90 respectively. Guide members 88 and 90 include converging portions 94 and 92 which join with substantially parallel portions 96 and 92 extending along the path of movement of the conveyor means as indicated by the arrow in FIG. 3 and designated by the letter A. The arrangement is such that the converging portions 92 and 94 are adapted to engage the intermediate portion 44 of the member 40 of the conveyor means so that even if the conveyor means is swinging from side to side, it will engage one of the portions 92 and 94 and be guided into the space between the portions 96 and 98 of the guide members so that the conveyor means will be accurately guided toward the diverting means hereinafter described.

The diverting means includes a pair of generally vertically upstanding support portions 100 and 102 which support cross mmbers 104 and 106. A pair of generally horizontally extending portions 108 and 110 define an apex portion 111 and flare outwardly along the direction of movement of the apparatus, these portions 108 and 110 being supported by cross member 104 and joining integrally with longitudinally extending side portions 112 and 114 respectively. These side portions 112 and 114 are disposed substantialy parallel with one another and with the path of movement of the apparatus, the two side portions being offset on opposite sides of such path of movement.

The side portions 112 and 114 join respectively with portions 116 and 118 which taper inwardly along the path of movement to a second apex portion 19, portions 116 and 118 being supported by cross member 106.

It is apparent that when a particular conveyor means passes through the guide means 76, the anti-friction roller 50 thereon will engage one of the portions 108 and 110 of the diverting means. The anti-friction rollers 50 of successive ones of the conveyor means are offset on opposite sides of the path of movement of the conveyor means so that alternate ones of the chairs will be diverted to opposite sides of the diverting means. That is to say, the roller 50 of one conveyor means will engage portion 110 and then ride up on the side portion 114, while the next chair is so arranged that the roller 50 thereof will engage portion 108 of the diverting means and ride up on the side portion 112.

As the conveyor means passes along the side portions 112 and 114, skiers are seated in the chairs so as to load the conveyor means, whereupon the rollers will then ride along portions 116 and 118 of the diverting means so that the conveyor means will return to its normal vertical position directly beneath the overhanging cable.

In order to enable the skiers to be properly seated in the chairs with a minimum of impact, retarding means is operatively associated with each of side portions 112 and 114 for momentarily retarding the movement of the conveyor means just at the point where the skiers are about to sit down in the chairs. The retarding means associated with side portions 112 and 114 are indicated by reference numerals 120 and 122 respectively. These retarding means are of substantially identical construction, and accordingly a description of one of them is considered sufficient, the retarding means 120 being illustrated in detail in FIG. 5.

As seen in FIG. 5, it will be noted that side portion 112 of the diverting means is of tubular construction, it being understood that the various components of the guide means and diverting means may be formed of a suitable rigid material such as tubular steel or the like. The section shown in FIG. 5 is also taken through the offset portion 44 of the conveyor means, it being noted that member 40 may also be of tubular construction. The roller 50 may be of a hardened steel material so as to prevent undue wear thereof.

Side portion 112 is provided with a first hole 130 which receives a sleeve member 132, sleeve member 132 being suitably rigidly supported in the position shown as by welding or the like. A non-circular hole 134 is provided at a point diametrically opposite hole 130 and is adapted to slidably receive a member 138 which fits snugly within hole 134 and includes a sloping surface 140 adapted to be engaged by the roller 50. Member 138 includes an enlarged flange 142 for limiting outward movement thereof.

A compression spring 144 engages the inner end of member 138 and the opposite end of compression spring 144 is in engagement with a disc-like plate 146 slidably supported within sleeve 132.

An adjusting bolt 148 is threadably mounted within a nut 150 rigidly secured as by welding to the outer surface of side portion 112. It is apparent that by threading the bolt 148 inwardly or outwardly, the force which spring 144 exerts on member 138 may be selectively adjusted so as to vary the resistance to movement of member 138. In this manner, the degree of retarding force applied to movement of roller 50 along side portion 112 in the direction of movement of the apparatus may be readily determined.

Referring again to FIG. 4, it will be seen that when one of the conveyor means 126 is positioned along side portion 112 such that the roller 50 thereof engages the retarding means 120, the movement of the conveyor means will be temporarily retarded, and the conveyor means will tilt forward s'ightly as illustrated. The skiers indicated by reference character S are positioned so that they are ready to sit down in the chair at this point so that when the chair reaches them, it is temporarily retarded and they sit down, whereupon the forward pull of the cable plus the weight of the skiers will tend to bias the retarding means inwardly so that the chair will swing forwardly and then upwardly which also is advantageous since it will tend to raise the forward tips of the skis and prevent them from becoming fouled with the snow beneath the skiers.

Referring now to FIG. 2, the manner in which skiers are loaded onto the ski-lift is indicated. Three pairs of skiers are indicated generally by reference characters 160, 162 and 164, these skiers beng disposed in staggered relationship so that they can successively move into position for loading at one side of the diverting means. In a similar manner, three pairs of skiers 166, 168 and 170 are disposed in staggered relation on the opposite side of the loading area so as to be loaded on the opposite side of the diverting means. When one pair of skiers has been loaded, the next pair of skiers moves into loading position, and this cycle of operation is repeated.

It is apparent from the foregoing that there is provided according to the present invention a new and novel conveyor apparatus which automatically diverts or switches alternate ones of the conveyor means to opposite sides of the path of movement of the apparatus and wherein such conveyor means are properly oriented for loading when so diverted. Means is provided for properly guiding the conveyor means into position for engagement with the diverting means, and the diverting means includes retarding means for temporarily retarding movement of the conveyor means to enable successful loading of skiers onto the ski-lift.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Conveyor apparatus comprising a plurality of spaced conveyor means, means for supporting and moving said conveyor means in a particular path of movement past a loading station, and substantially fixed diverting means engageable with portions of said conveyor means for automatically diverting successive ones of said conveyor means in substantially opposite directions laterally of said path of movement to allow the apparatus to be loaded alternately at opposite sides of said path of movement, each of said conveyor means including anti-friction means for engaging said diverting means, the anti-friction means of successive conveyor means being offset on opposite sides laterally of said path of movement so that successive ones of the conveyor means are diverted to opposite sides of the diverting means so that the conveyor means can be loaded at said loading station from opposite sides of the diverting means.

2. Apparatus as defined in claim 1 including hinge means allowing limited pivotal movement of each of said conveyor means in a direction laterally of said path of movement.

3. Apparatus as defined in claim 1 wherein said diverting means includes an apex portion engageable by portions of said conveyor means as the conveyor means moves along said path of movement, said apex portion flaring outwardly along said path of movement and joining with a pair of side portions extending generally parallel with said path of movement.

4. Apparatus as defined in claim 3 including retarding means operatively associated with said side portions for retarding the movement of said conveyor means therepast.

5. Apparatus as defined in claim 4 wherein said retarding means includes portions extending laterally outwardly of said side portions, and being movable with respect to said side portions, and means for adjusting the degree of resistance to movement of said retarding means.

6. Apparatus as defined in claim 3 including guide means comprising a pair of converging portions extending toward said apex portion of the diverting means for guiding portions of said conveyor means toward said apex portion.

7. Apparatus as defined in claim 1 wherein each of said conveyor means is mounted for swinging movement in two directions with respect to said supporting and moving means, each of said conveyor means also including hinge means allowing limited pivotal movement of said conveyor means laterally of said path of movement, each of said conveyor means further including anti-friction means for engaging said diverting means, the anti-friction means of successive conveyor means being offset laterally on opposite sides of said path of movement.

8. Apparatus as defined in claim 1 wherein said diverting means includes an apex portion which flares outwardly along said path of movement and joins with a pair of substantially parallel relatively straight side portions disposed substantialy parallel with said path of movement and offset on opposite sides thereof, said side portions in turn joining with a tapered portion extending along said path of movement, guide means comprising a pair of converging portions extending toward said apex portion for guiding said conveyor means toward said apex portion, and retarding means supported by each of said side portions and extending laterally therefrom for engaging portions of said conveyor means to retard the movement thereof.

9. Apparatus as defined in claim 1 wherein said supporting and moving means comprises a ski tow cable, each of said conveyor means being mounted for swinging movement in two directions with respect to said cable, each of said conveyor means including hinge means permitting limited pivotal movement of the conveyor means laterally with respect to said path of movement, each of said conveyor means including anti-friction means for engaging said diverting means, the anti-friction means of successive conveyor means being disposed on opposite sides of said path of movement, said diverting means including an apex portion flaring outwardly along said path of movement and joining with a pair of generally parallel straight side portions disposed parallel with said path of movement and on opposite sides thereof, said side portion in turn joining with portions tapering toward one another along said path of movement, guide means including a pair of converging portions for engaging portions of said conveyor means to guide said conveyor means toward said apex portion, and retarding means supported by said side portions for engaging portions of said conveyor means to retard the movement thereof along said side portions, said retarding means being movable with respect to said side portions, and means for adjusting the resistance to movement of said retarding means.

References Cited

UNITED STATES PATENTS 3,196,808  7/1962  Senn _____ 104—173
3,330,223  7/1967  Gaynor _____ 104—173

FOREIGN PATENTS 814,094  11/1936  France.

ARTHUR L. LA POINT, *Primary Examiner.*

D. F. WORTH, *Assistant Examiner.*